United States Patent [19]
Kassner

[11] Patent Number: 5,662,370
[45] Date of Patent: Sep. 2, 1997

[54] VEHICLE LOW SUN VISOR

[76] Inventor: William H. Kassner, R2 368C Tuckahoe Rd., Williamstown, N.J. 08094

[21] Appl. No.: 491,249

[22] Filed: Jun. 16, 1995

[51] Int. Cl.$^6$ ........................................................ B60J 3/02
[52] U.S. Cl. ........................ 296/97.6; 296/97.8; 296/97.9
[58] Field of Search ........................... 296/97.6, 97.8, 296/97.9

[56]         References Cited

U.S. PATENT DOCUMENTS

| | | | |
|---|---|---|---|
| 2,528,038 | 10/1950 | Crise | 296/97.6 |
| 2,855,241 | 10/1958 | Walter | 296/97 |
| 3,159,421 | 12/1964 | Samuelson | 296/97 |
| 3,351,375 | 11/1967 | Wheeler | 296/97.6 |
| 3,445,135 | 5/1969 | Masi . | |
| 3,695,658 | 10/1972 | Vacha | 296/97.6 |
| 4,090,732 | 5/1978 | Vistitsky | 296/97 |
| 4,167,287 | 9/1979 | Franklin et al. | 296/97.6 |
| 4,248,473 | 2/1981 | Hildebrand | 296/97 |
| 4,736,979 | 4/1988 | Harvey | 296/97 |
| 4,848,822 | 7/1989 | Da Costa | 296/97 |
| 5,356,192 | 10/1994 | Schierau | 296/97 |

FOREIGN PATENT DOCUMENTS

| | | | |
|---|---|---|---|
| 1143470 | 10/1957 | France | 296/97.8 |
| 2310894 | 12/1976 | France | 296/97.6 |
| 2825516 | 12/1979 | Germany | 296/97.8 |
| 366577 | 1/1939 | Italy . | |
| 509335 | 4/1956 | Italy | 296/97.6 |
| 247216 | 10/1989 | Japan | 296/97.8 |

*Primary Examiner*—Gary C. Hoge

[57] ABSTRACT

An apparatus is connected to or is part of a standard sun visor to solve the problem of a person driving along the road facing the sun when it is close to the horizon. To block out the sun disc the driver is able to easily adjust the protection as the road turns and the car changes direction by flipping down an adjacent panel and flipping up the one no longer useful to block out the sun. The apparatus includes an elongate member, a clamp attaching the elongate member along the lower edge of the visor panel, three to six individual opaque panel members, each hingeably attached and juxtaposed side by side to swing up or down, each sized to block off the sun disc to the horizon.

16 Claims, 4 Drawing Sheets

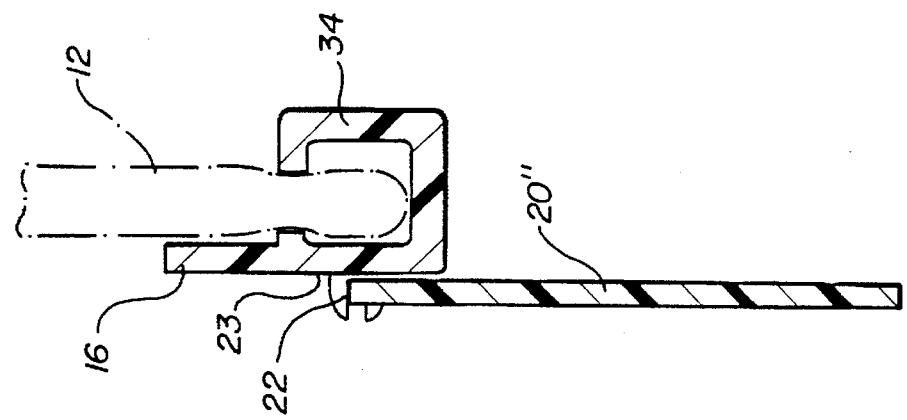
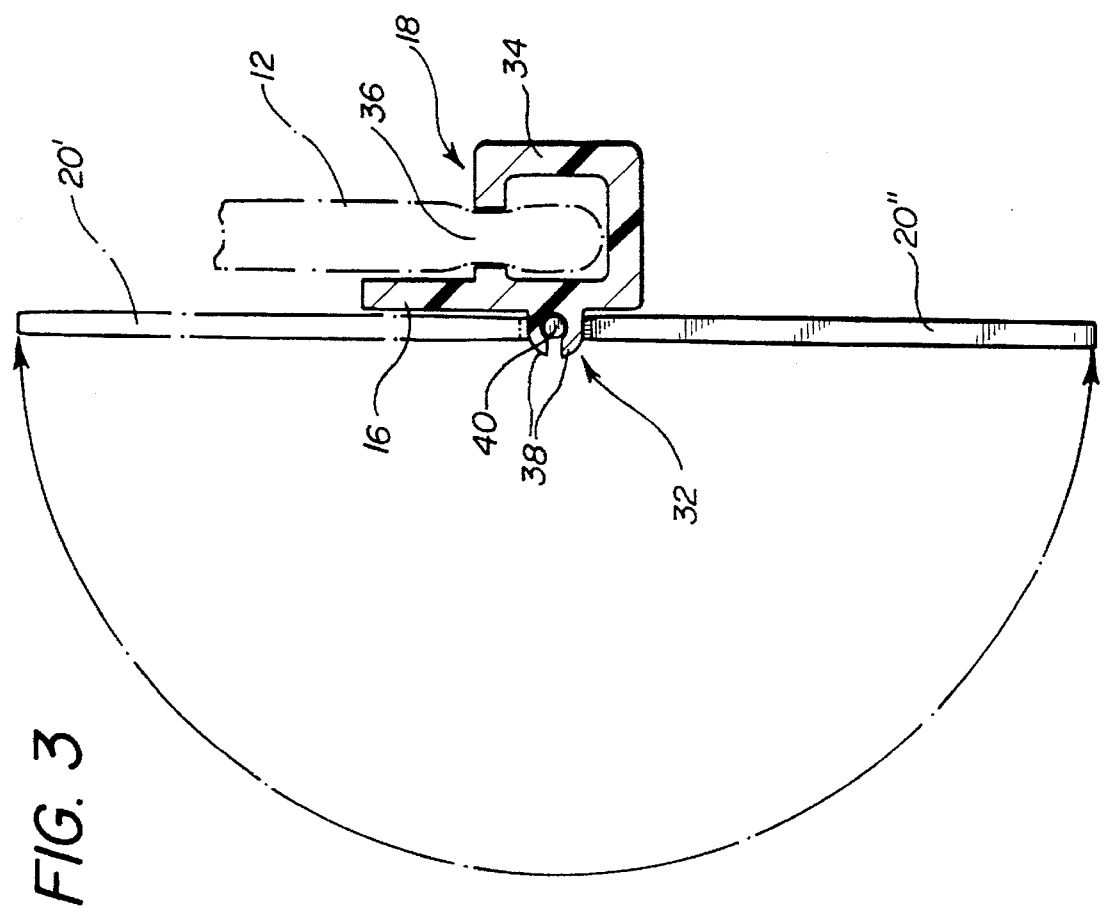

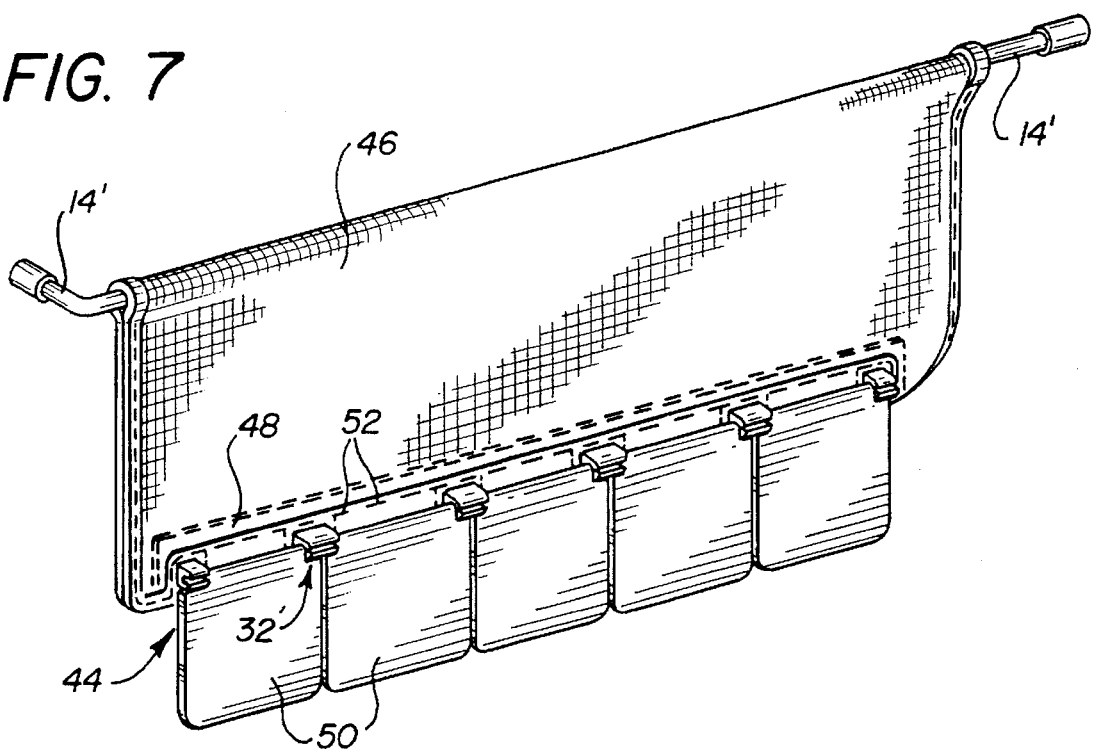
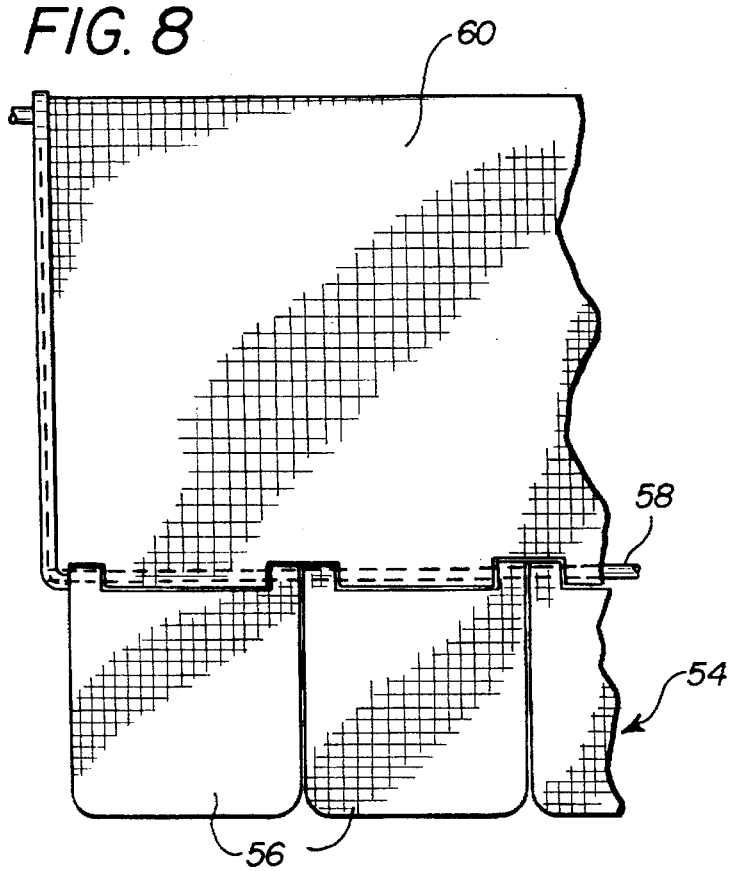
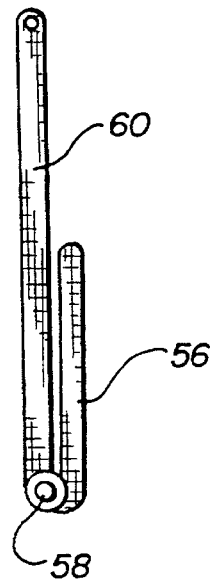

VEHICLE LOW SUN VISOR

BACKGROUND OF THE INVENTION

This invention involves a sun visor for a motor vehicle and, more particularly, an apparatus directed to the problem of shielding the driver of a motor vehicle from the glare of the sun when it is close to the horizon. Also, more particularly, the invention is directed to an apparatus that supplements the standard sun visor in motor vehicles.

When driving early or late in the day directly at the sun, the driver may be blinded causing a highly hazardous condition. The standard sun visor is of little help in that if it is positioned to completely blot out the sun, the driver cannot see the road. A variety of supplementary sun visor devices have been provided, but none give a satisfactory solution for the problem.

In U.S. Pat. No. 3,445,135 to Masi, a supplementary perforated visor is clipped on to the bottom of the standard sun visor and may be rotated downwardly to partially shield the sun. In U.S. Pat. No. 4,090,732 to Vistitsky, a supplementary sun visor is provided utilizing an opaque panel and a semitransparent tinted panel that again partially reduces the sun's glare or almost completely hides the roadway. In U.S. Pat. No. 4,736,979 to Harvey, an auxiliary sun visor is provided where a panel extending downwardly from the bottom edge of the sun visor may be slid horizontally from side to side to block the sun. In U.S. Pat. No. 4,248,473 to Hildebrand, a sun-shade auxiliary device is provided wherein an entire bank of vertically hinged panels may be slid from side to side horizontally and the entire bank of panels may be hinged on a horizontal axis only as an integral unit. A rollable sun visor with moveable sections is disclosed in U.S. Pat. No. 2,855,241 to Walter. In U.S. Pat. No. 5,356,192 to Schierau, a semitransparent panel is attached to and extends down from the standard vehicle visor. Likewise, in U.S. Pat. No. 3,159,421 to Samuelson, a tinted transparent panel is hingeably connected to the standard sun visor. In U.S. Pat. No. 4,848,822 to Da Costa, a hingeably attached extension for motor vehicles visor is described. A hinged transparent tinted panel is attached to the standard sun visor in the diagrams of Italian Patent Number 366,577.

These devices either do not satisfactorily attend to the problem or they fail to attain the objects described herein below.

SUMMARY OF INVENTION

As a person is driving along the road facing the sun when it is close to the horizon, the need is to block out the sun disc as completely as possible. The driver must then be in a position to easily adjust the protection as the road turns and the car changes direction. In most cases, once the device is adjusted to block the sun, going down or going up an incline will have little effect on the performance of the devices of the present invention. The length of the panels and the positioning of these devices a suitable distance from the driver's face will bring the chosen panel down to and below the horizon. To adjust for slight changes in direction, as the sun disc begins to be visible on one side of the panel, it is easy to flip down an adjacent panel and flip up the one no longer useful without looking at them to block out the sun. Although devices of the present invention will perform satisfactorily with only three separate panels, it is preferred that there be at least four panels, and most preferably at least five panels. As the number of panels of the preferred width is decreased the extent of coverage of the horizon is limited. As the number of panels is decreased together with widening of the width of the panels, such as two panels six inches wide, the risk of inadvertently blocking a car or pedestrian is increased. As the number of panels of the preferred width is increased the device becomes too long and the extra panels are not used. As the number of panels is increased together with narrowing of the width of the panels, such as ten panels two inches wide, the difficulty of blocking the sun disc is increased.

It is an Object of the present invention to provide an auxiliary sun visor which may be attached or incorporated directly into the standard sun visor.

It is a further object of the protection sought to provide a device which allows the driver to selectively choose a small section to block the sun disc while allowing an unobstructed view of essentially the entire roadway.

It is a particular object of the protection sought to provide an unfiltered and unrestricted view of the roadway while blocking out the sun disc.

It is a further object of the protection sought to provide a series of hinged panels which may be selectively pulled down to block the sun while easily allowing the pushing up of the prior blocking panel and pulling down of an adjacent panel as the motor vehicle changes direction and unblocks the sun.

It is a further object of the present invention to provide a simple and inexpensive device that may be molded out of plastic and assembled with minimal expense to provide the safety device.

It is a further object of the present invention to provide a device that may be of a chosen length extending across a sufficient expanse of the windshield.

An aspect of the invention is an apparatus connected to a sun visor that is attached proximate a front windshield of a motor vehicle. The function of the apparatus is to shield the sun disc close to the horizon from the eyes of a driver. The sun visor includes a visor panel that includes a lower edge along a horizontal length up to about one-half of a width of the front windshield, and a visor attachment means hingeably attaching the visor panel to the motor vehicle inside the front windshield and allowing the visor panel to move to a position wherein the visor panel is proximately vertical with the lower edge positioned downwardly. The apparatus includes an elongate member of a length up to about one-half a width of the windshield and apparatus attachment means attaching the elongate member along the length of the lower edge of the visor panel. The apparatus further includes at least three individual panel members, each panel member including a face that includes an upper edge and a lower edge, a length from the upper edge to the lower edge sufficient to block off sight all the way to the horizon when the panel member is in the vertical position, side edges, and a width from side edge to side edge sufficient to block off sight of the entire sun disc. The apparatus further includes panel member attachment means to hingeably attach the upper edge of each panel member to the elongate member aligned with the side edges juxtaposed side edge to side edge, and allow each panel member to individually rotate from a position proximately abutting the face of the panel member against a surface of the panel of the sun visor, to a downwardly vertical position wherein the panel member extends downwardly from the elongate member with the lower edge of the panel member at a lowest height.

It is preferred that each panel member be sufficiently translucent to prevent essentially all sunlight from passing through the panel to the eyes of the driver and more preferably opaque. It is further preferred that the width of each panel member be about three to about five inches, and more preferably about four inches. It is also preferred that the length of the elongate member is about twelve to about twenty-five inches, and more preferably about eighteen to about twenty-two inches. It is further preferred that the panel member attachment means include a pair of adjacent flanges extending outwardly from the elongate member and defining a horizontal bore of a diameter between them, a horizontal opening to a length of the horizontal bore of a width less than the diameter of the horizontal bore, a notch cut out of both opposite upper corners of each panel member, the notch bounded by a vertical edge and median horizontal edge, and a round pin member extending cantilevered from the vertical edge of the notch and parallel to the median horizontal edge. In this preferred embodiment a diameter of the round pin member is sufficient to snap fit through the horizontal opening and be the same or slightly larger than the diameter of the horizontal bore. It is also preferred that the apparatus attachment means include at least one length of a "U" shaped member attached to the elongate member of a size, shape, and elasticity to engage and securely hold the apparatus along the length of the lower edge of the visor panel. It is further preferred that the apparatus attachment means include an integral attachment into the visor panel and the panel member attachment means include at least one flange extending upwardly from the upper edge of each panel member, the flange having opposite vertical edges, a horizontal bore through the flange opening through both vertical edges, and a round rod member attached horizontally along the lower edge of the visor panel, wherein all the panel members are attached by threading the flanges onto the round rod member. It is also preferred that the panel member attachment means further include a detent means that imparts added resistance to start rotation of each panel member from the position proximately abutting the face of the panel member against a surface of the panel of the sun visor. It is further preferred that a detent means imparts added resistance to start rotation of each panel member from the downwardly vertical position.

Another aspect of the invention is an apparatus connected to a sun visor as above and attached as above, wherein the apparatus includes an elongate member of a length of about eighteen to about twenty-two inches and apparatus attachment means attaching the elongate member along the length of the lower edge of the Visor panel. The apparatus further includes at least three individual opaque panel members. Each panel member includes a face that includes an upper edge and a lower edge, a length from the upper edge to the lower edge sufficient to block off sight all the way to the horizon when the panel member is in a downwardly vertical position, side edges, and a width from side edge to side edge of about three to about five inches. The apparatus further includes panel member attachment means to hingeably attach the upper edge of each panel member to the elongate member aligned with the side edges juxtaposed side edge to side edge, and allow each panel member to individually rotate from a position proximately abutting the face of the panel member against a surface of the panel of the sun visor, to the downwardly vertical position wherein the panel member extends downwardly from the elongate member with the lower edge of the panel member at a lowest height. The panel member attachment means includes a pair of adjacent flanges extending outwardly from the elongate member and defining a horizontal bore of a diameter between them, a horizontal opening to a length of the horizontal bore of a width less than the diameter of the horizontal bore, a notch cut out of both opposite upper corners of each panel member, the notch bounded by a vertical edge and median horizontal edge, and a round pin member extending cantilevered from the vertical edge of the notch and parallel to the median horizontal edge, wherein a diameter of the round pin member is sufficient to snap fit through the horizontal opening and be the same or slightly larger than the diameter of the horizontal bore.

BRIEF DESCRIPTION OF THE DRAWINGS

FIG. 3 is a cross-sectional view taken along lines 3—3 of FIG. 1.

FIG. 4 is a cross-sectional view taken along lines 4—4 of FIG. 1.

FIG. 7 is a perspective view of a second embodiment of the invention.

FIG. 8 is a perspective view of a third embodiment of the invention.

FIG. 9 is a vertical cross-sectional view cut between panels 56.

DESCRIPTION OF PREFERRED EMBODIMENTS

Figure 1:
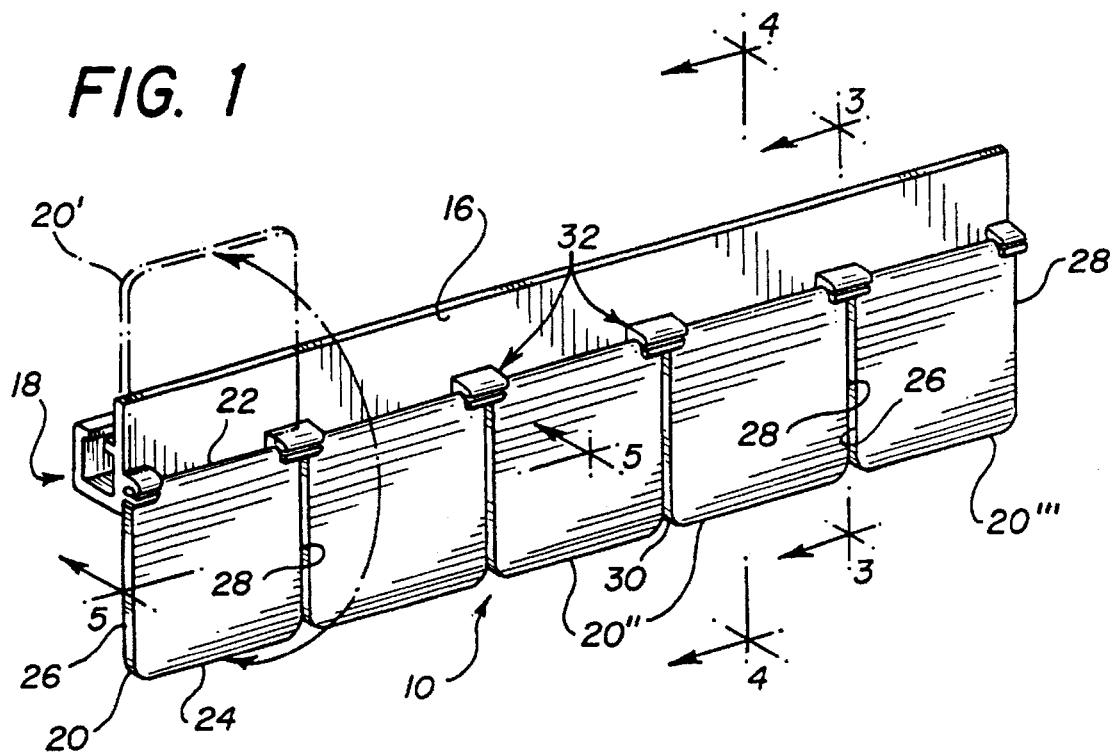
FIG. 1 is a front perspective view of an apparatus of the present invention.
Figure 2:
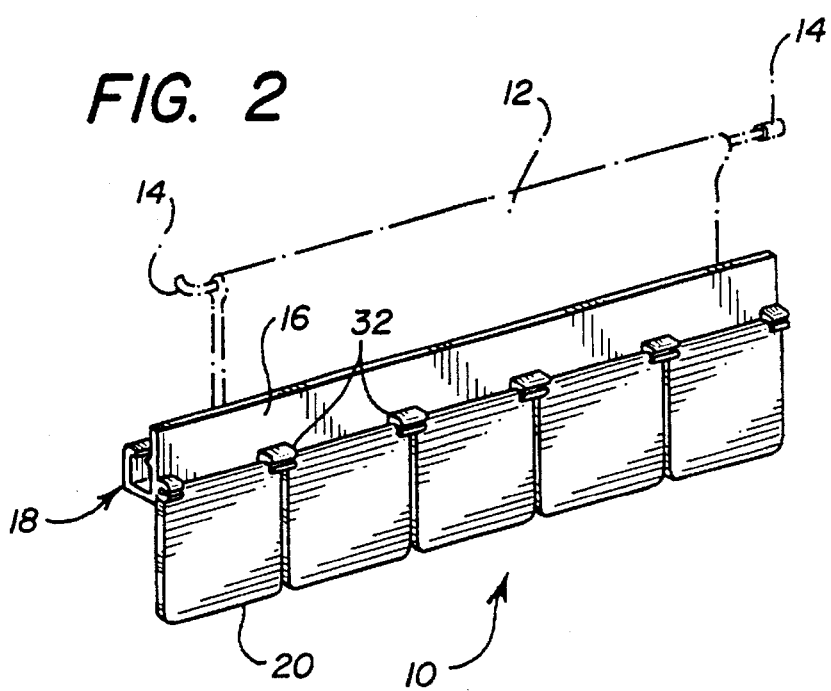
FIG. 2 is a perspective view of a standard sun visor on which the device illustrated in FIG. 1 is attached.
Figure 6:
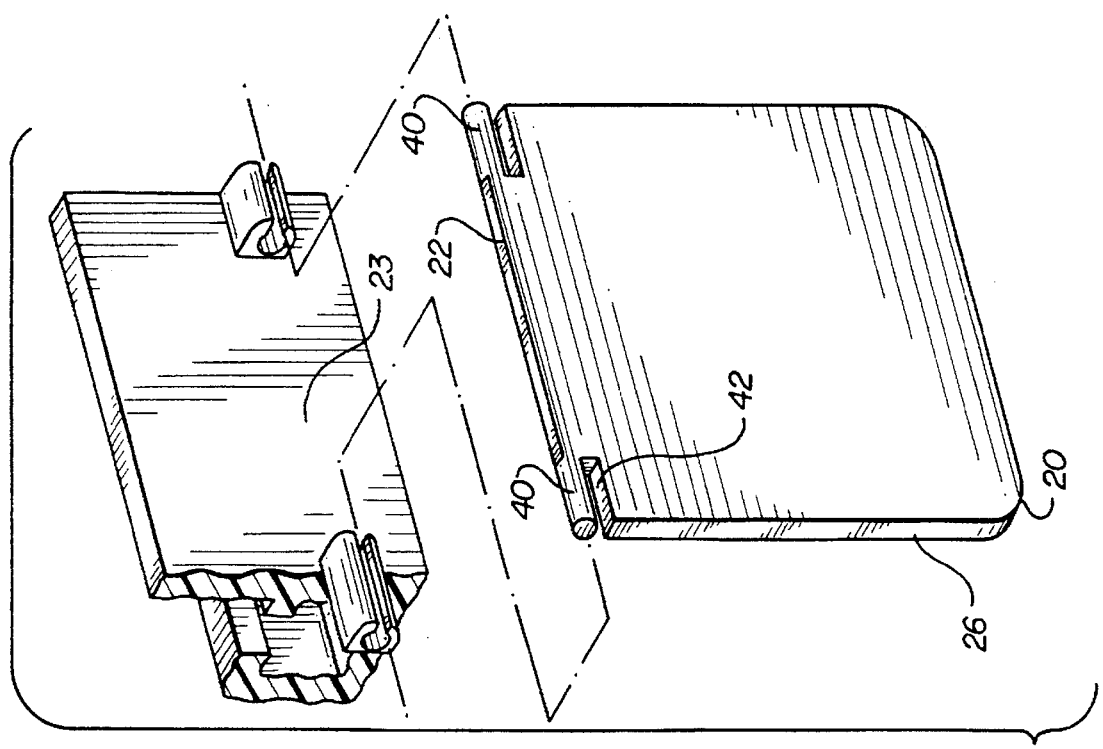
FIG. 6 is a partially cutaway exploded perspective view of a section of the apparatus illustrated in FIG. 1.
Figure 5:
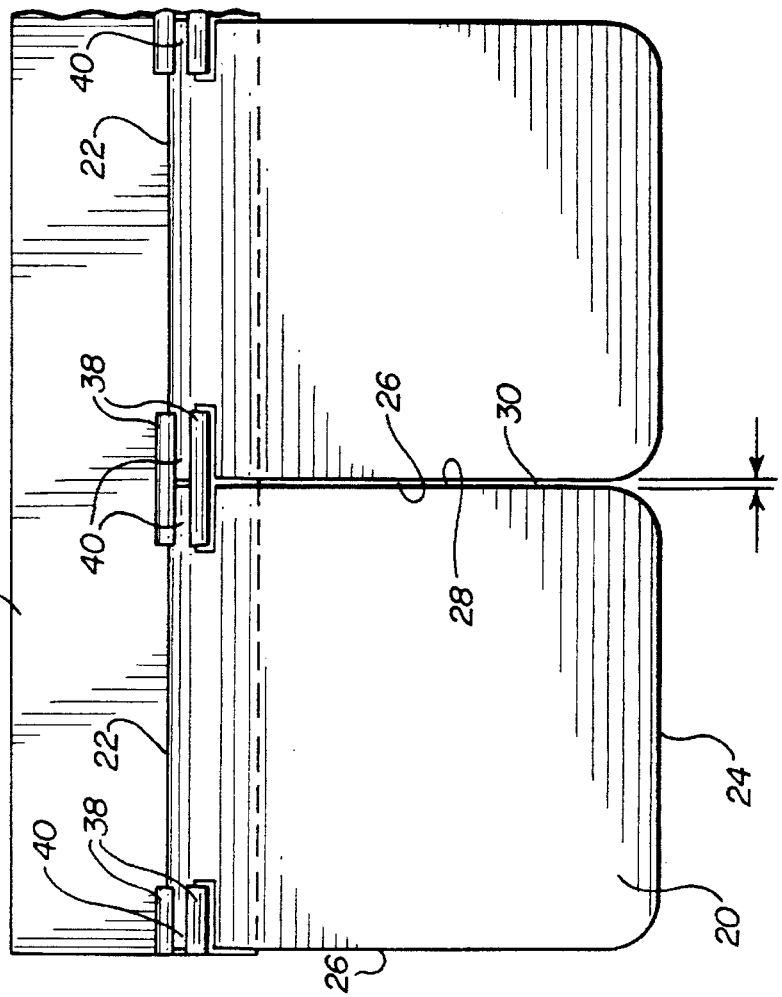
FIG. 5 is a partial cutaway planar view taken along lines 5—5 of FIG. 1.

As illustrated in FIGS. 1 and 2, apparatus 10 clips onto and securely attaches on the bottom edge of standard sun visor 12 which is hingeably connected through connections 14 to the inside upper frame of the front windshield of a motor vehicle. The length of device 10 may vary considerably and in this embodiment is about twenty inches long. This length allows the apparatus to cover essentially up to one-half the width of the entire windshield and can extend a distance somewhat wider than standard sun visors. In some embodiments, particularly where the elongate member is extruded, the device may be supplied with five or six panels, and the purchaser may chose to cut off a length equivalent to a panel or equivalent to two or three panels for smaller cars. Apparatus 10 includes elongate member 16 onto which apparatus attachment device 18 is integrally connected as further illustrated in FIGS. 3, 4, and 6. Panels 20 are individually and separately connected to member 16 through hinge connecting devices 32. Each of panel members 20 is capable of selectively rotating as shown in FIG. 1 from position 20 to position 20' and all angles in between. When the panel members are in position 20', they are not in use, but may be easily flipped downwardly to position the chosen panel member to block the sun disc on the horizon. Each panel member 20 has upper edge 22 which when attached to visor 12 is proximate the lower edge of the visor. Each panel member 20 also has lower edge 24 and the length of each panel member from upper edge 22 to lower edge 24 is sufficient to reach the horizon and completely block out the sun in that sector. In this embodiment, this length is about three inches. Each panel member also has left edge 26 and right edge 28, and the width between these edges is a little less than four inches. Each panel member is about ⅛ inch thick and is molded of a rigid or semi-rigid polymeric plastic such as polypropylene, high-density polyethylene, ABS, polycarbonate, polymethyl methacrylate, polystyrene, and various engineering plastics, such as DELRIN®, nylon, and like polymers. Higher heat distortion plastics are preferred and UV light stabilized polymers are also preferred. Each panel member 20 is injection molded of a pigmented molding composition that yields an opaque product. Each panel member 20 has integral molded pins 40 extending along upper edge 22 toward the left and right edges above openings 42. Each round pin 40 is about ⅛ inch in diameter and about ¼ inch long. The edge corners of flat edge surface 22 of the upper edge of panel 20 between each pin causes each panel to detent in either a vertical upward or a vertically downward position against the surface of elongate member 16. As shown in FIGS. 3, 4, and 6, "C" shaped channel 34 is integrally molded to elongate member 16 with upper opening 36 sufficient to allow the lower edge of visor panel 12 to be gripped inside channel member 34. Female hinge sockets 38 are also integrally molded into the combination of elongate member 16 and gripping channel 34. Actually, this combination is preferably extruded after which the material between hinge sockets 38 is machined off leaving the individual dual-sockets which are about ½ inch in length. The length of the unit can be chosen by cutting through the middle of a hinge socket combination. This cut can be made by the manufacturer or the purchaser or both. Pins 40 snap fit into the jaws of female hinge socket 38 and are free to rotate in a vertical arc. It is preferred that the space between panel members 20 be as small as possible. Space 30 between the vertical edges of interior panel members 20" is about 1/16 of an inch. Closer tolerances allow the space between the panel members to be less, but this distance is satisfactory. As aligned, there are five panel members in apparatus 10 each aligned side by side with edges 28 and 26 of adjacent panels in virtual abutment. Outside panel members 20 and 20'" have their outside edges exposed.

While the apparatus illustrated in FIGS. 1 through 6 is intended for use in previously constructed motor vehicles and to be attached on essentially any sun visor, apparatuses 44 and 54 illustrated in FIGS. 7 through 9 are incorporated directly into and are permanently attached to sun visors 46 and 60 which are hingeably attached to the motor vehicle by standard mechanisms 14'. In apparatus 44, panel members 50 are essentially identical to that of panel members 20 and are connected through hinge connecting devices 32' to elongate member 48 which is attached to visor 46 through stitches 52. Apparatus 44, as well as other embodiments of the present invention may be attached to the visor using a variety of methods, including adhesive, mechanical fasteners, and the like. For apparatus 54, metal rod 58 is incorporated directly into the construction of visor 60 as the lower edge. Small sections of rod 58 are left exposed by the standard fabric covering over visor 60. Panels 56, covered with the same fabric, have female hinge extensions that are threaded onto rod 58 at the exposed sections, allowing each panel 56 to hinge vertically upward as shown in FIG. 9 and vertically downwardly in the sun blocking position as shown in FIG. 8. Although the panels in the drawings are shown all pulled to the downward vertical position, it is understood that in use, typically only one of the panels would be in the downward position and the balance of panels in the upward position.

While this invention has been described with reference to specific embodiments disclosed herein, it is not confined to the details set forth and the patent is intended to include modifications and changes which may come within and extend from the following claims.

I claim:

1. An apparatus connected to a sun visor attached proximate a front windshield of a motor vehicle to shield the sun disc close to the horizon from the eyes of a driver, wherein the sun visor comprises:

(a) a visor panel comprising a lower edge along a horizontal length up to about one-half of a width of the front windshield, and
    (b) visor attachment means hingeably attaching the visor panel to the motor vehicle inside the front windshield and allowing the visor panel to move to a proximately downwardly vertical position with the lower edge positioned downwardly, wherein the apparatus comprises:

(a) an elongate member of a length up to about one-half a width of the windshield,
    (b) apparatus attachment means attaching the elongate member along the length of the lower edge of the visor panel,
    (c) at least three individual panel members, each panel member being of a composition to prevent essentially all sunlight from passing through the panel member to the eyes of the driver and comprising a face comprising:
        (i) an upper edge and a lower edge,
        (ii) a length from the upper edge to the lower edge sufficient to block off sight all the way to the horizon when the panel member is in a downwardly vertical position,
        (iii) side edges, and
        (iv) a width from side edge to side edge sufficient to block off sight of the entire sun disc,
    (d) panel member attachment means to:
        (i) hingeably attach the upper edge of each panel member to the elongate member aligned with the side edges juxtaposed side edge to side edge with a distance between said edges less than about one-sixteenth of an inch, and
        (ii) allow each panel member to individually rotate from an upwardly vertical position to the downwardly vertical position wherein the panel member extends downwardly from the elongate member with the lower edge of the panel member at a lowest height.

2. The apparatus of claim 1 wherein each panel member is opaque.

3. The apparatus of claim 1 wherein the width of each panel member is about three to about five inches.

4. The apparatus of claim 3 wherein the width of each panel member is about four inches.

5. The apparatus of claim 1 wherein the length of the elongate member is about twelve to about twenty-five inches.

6. The apparatus of claim 5 wherein the length of the elongate member is about eighteen to about twenty-two inches.

7. The apparatus of claim 1 wherein the panel member attachment means comprises:

(a) a pair of adjacent flanges extending outwardly from the elongate member and defining a horizontal bore of a diameter between them,
    (b) a horizontal opening to a length of the horizontal bore of a width less than the diameter of the horizontal bore,
    (c) a notch cut out of both opposite upper corners of each panel member, the notch bounded by a vertical edge and median horizontal edge, and
    (d) a round pin member extending cantilevered from the vertical edge of the notch and parallel to the median horizontal edge, wherein a diameter of the round pin member is sufficient to snap fit through the horizontal opening and be the same or slightly larger than the diameter of the horizontal bore.

8. The apparatus of claim 1 wherein the apparatus attachment means comprises at least one length of a "U" shaped member attached to the elongate member of a size, shape, and elasticity to engage and securely hold the apparatus along the length of the lower edge of the visor panel.

9. The apparatus of claim 1 wherein the apparatus attachment means comprises an integral attachment into the visor panel and the panel member attachment means comprises:

(a) at least one flange extending upwardly from the upper edge of each panel member, the flange having opposite vertical edges, (b) a horizontal bore through the flange opening through both vertical edges, and (c) a round rod member attached horizontally along the lower edge of the visor panel,
   wherein all the panel members are attached by threading the flanges onto the round rod member.

10. The apparatus of claim 1 wherein the panel member attachment means further comprises a detent means that imparts increased resistance to start rotation from rest of each panel member from the upwardly vertical position.

11. The apparatus of claim 10 wherein the detent means also imparts increased resistance to start rotation from rest of each panel member from the downwardly vertical position.

12. An apparatus connected to a sun visor attached proximate a front windshield of a motor vehicle to shield the sun disc close to the horizon from the eyes of a driver, wherein the sun visor comprises:

(a) visor panel comprising a lower edge along a horizontal length up to about one-half of a width of the front windshield, and (b) visor attachment means hingeably attaching the visor panel to the motor vehicle inside the front windshield and allowing the visor panel to move to a proximately downwardly vertical position with the lower edge positioned downwardly, wherein the apparatus comprises:

(a) an elongate member of a length of about eighteen to about twenty-two inches, (b) apparatus attachment means attaching the elongate member along the length of the lower edge of the visor panel, (c) at least three individual opaque panel members, each panel member comprising a face comprising:
   (i) an upper edge and a lower edge,
   (ii) a length from the upper edge to the lower edge sufficient to block off sight all the way to the horizon when the panel member is in a downwardly vertical position,
   (iii) side edges, and
   (iv) a width from side edge to side edge of about three to about five inches, (d) panel member attachment means to:
   (i) hingeably attach the upper edge of each panel member to the elongate member aligned with the side edges juxtaposed side edge to side edge, and
   (ii) allow each panel member to individually rotate from an upwardly vertical position to the downwardly vertical position wherein the panel member extends downwardly from the elongate member with the lower edge of the panel member at a lowest height, the panel member attachment means comprising:
      (i) a pair of adjacent flanges extending outwardly from the elongate member and defining a horizontal bore of a diameter between them,
      (ii) a horizontal opening to a length of the horizontal bore of a width less than the diameter of the horizontal bore,
      (iii) a notch cut out of both opposite upper corners of each panel member, the notch bounded by a vertical edge and median horizontal edge, and
      (iv) a round pin member extending cantilevered from the vertical edge of the notch and parallel to the median horizontal edge.
      wherein a diameter of the round pin member is sufficient to snap fit through the horizontal opening and be the same or slightly larger than the diameter of the horizontal bore.

13. The apparatus of claim 12 wherein the width of each panel member is about four inches.

14. The apparatus of claim 12 wherein the apparatus attachment means comprises at least one length of a "U" shaped member attached to the elongate member of a size, shape, and elasticity to engage and security hold the apparatus along the length of the lower edge of the visor panel.

15. The apparatus of claim 12 wherein the panel member attachment means further comprises a detent means that imparts increased resistance to start rotation from rest of each panel member from the upwardly vertical position.

16. The apparatus of claim 10 wherein the detent means also imparts increased resistance to start rotation from rest of each panel member from the downwardly vertical position.

* * * * *